(12) United States Patent
Williams et al.

(10) Patent No.: US 8,601,936 B2
(45) Date of Patent: Dec. 10, 2013

(54) COMBINED BREWING SYSTEM

(75) Inventors: Ian Stuart Williams, Glendowie Auckland (NZ); Anders Gordon Warn, Onehunga Auckland (NZ)

(73) Assignee: Williamswarn Holdings Limited, Hastings (NZ)

( * ) Notice: Subject to any disclaimer, the term of this patent is extended or adjusted under 35 U.S.C. 154(b) by 724 days.

(21) Appl. No.: 12/696,178

(22) Filed: Jan. 29, 2010

(65) Prior Publication Data

US 2010/0129490 A1 May 27, 2010

Related U.S. Application Data

(63) Continuation-in-part of application No. PCT/NZ2008/000191, filed on Jul. 31, 2008.

(30) Foreign Application Priority Data

Aug. 1, 2007 (NZ) ........................................ 560271
Dec. 10, 2007 (NZ) ........................................ 564137

(51) Int. Cl.
*A47J 31/44* (2006.01)
*A23L 3/00* (2006.01)
*C12C 11/11* (2006.01)

(52) U.S. Cl.
USPC .................. 99/281; 99/470; 426/11; 426/592

(58) Field of Classification Search
USPC ................................ 99/281, 470; 426/11, 592
See application file for complete search history.

(56) References Cited

U.S. PATENT DOCUMENTS

| | | | |
|---|---|---|---|
| 3,729,321 A | 4/1973 | Vacano | |
| 3,946,780 A | 3/1976 | Sellers | |
| 4,423,670 A | 1/1984 | Tenison | |
| 4,557,186 A | 12/1985 | Brown | |
| 4,708,938 A | 11/1987 | Hickinbotham | |
| 4,754,698 A | 7/1988 | Naish | |
| 5,096,724 A | 3/1992 | Zenner et al. | |
| 5,235,901 A | 8/1993 | MacLennan et al. | |
| 5,364,639 A | 11/1994 | MacLennan et al. | |
| 5,365,830 A | 11/1994 | MacLennan et al. | |
| 5,718,161 A | 2/1998 | Beadle | |

(Continued)

FOREIGN PATENT DOCUMENTS

CA 2227023 A1 9/1999
CN 1168919 A 12/1997

(Continued)

OTHER PUBLICATIONS

Briggs et al. "Brewing Science and Practice", Published by CRC Press and Woodhead Publishing Limited in 2004, 18 Pages.

*Primary Examiner* — Jianying Atkisson
(74) *Attorney, Agent, or Firm* — Young & Thompson

(57) ABSTRACT

A combined brewing system for small scale brewing of fermented alcoholic beverages, particularly beer, and to a method of making fermented alcoholic beverages. The brewing system comprises a single pressurizable vessel. The beer is naturally carbonated to the desired level during fermentation. Sediment is collected and substantially separated from within the vessel and removed from the vessel while the vessel is under pressure. Compressed gas is added for maintaining natural carbonation levels, so that the contents of the vessel can be drawn off at a desired pressure. The vessel has a temperature control system to selectively control the temperature during processing.

7 Claims, 3 Drawing Sheets

(56) References Cited

U.S. PATENT DOCUMENTS

| | | | |
|---|---|---|---|
| 6,032,571 A | 3/2000 | Brous et al. | |
| 2003/0177910 A1 | 9/2003 | Lu et al. | |
| 2004/0129144 A1 | 7/2004 | Beadle | |
| 2005/0279214 A1 | 12/2005 | Blichmann | |
| 2006/0138177 A1 | 6/2006 | Wauters et al. | |

FOREIGN PATENT DOCUMENTS

| | | | |
|---|---|---|---|
| DE | 4205538 A1 | | 9/1993 |
| DE | 19524783 C1 | | 6/1997 |
| DE | 19747050 A1 | | 4/1998 |
| GB | 2138021 A | | 10/1984 |
| GB | 2157314 A | | 10/1985 |
| GB | 2186288 A | | 8/1987 |
| GB | 2215230 A | * | 9/1989 |
| JP | 7327658 A | | 12/1995 |
| JP | 10313848 A | | 12/1998 |
| WO | 9832836 A2 | | 7/1998 |
| WO | 9950383 A2 | | 10/1999 |
| WO | 2005061691 A1 | | 7/2005 |
| WO | 2008020760 A1 | | 2/2008 |

* cited by examiner

COMBINED BREWING SYSTEM

CROSS-REFERENCE TO RELATED APPLICATIONS

This application is a continuation-in-part of PCT application PCT/NZ2008/000191 filed Jul. 31, 2008, which, in turn, claims priority to New Zealand applications NZ560271 filed Aug. 1, 2007 and NZ564137 filed Dec. 10, 2007.

FIELD OF THE INVENTION

The invention relates to a combined brewing system for making alcoholic beverages through fermentation, and/or to a method of making an alcoholic beverage using a combined brewing system. The invention is particularly suitable for home brewing or small scale brewing of beverages such as beer, cider, mead and wine.

BACKGROUND

Brewing alcoholic beverages such as beer, cider, mead or wine through yeast fermentation involves the chemical conversion of carbohydrates into alcohols and carbon dioxide ($CO_2$). In order to make different alcoholic beverages by way of yeast fermentation, different carbohydrates must be used. To produce beer, hops and grains are used. In the case of cider, apple juice is used as a carbohydrate. To make mead, honey is used, whereas, in making wine, juice (typically grape juice) is used. Irrespective of the carbohydrate used, each of the alcoholic beverages produced involves a yeast fermentation process whereby the carbohydrates provided are converted to alcohol and $CO_2$.

One of the most commonly produced yeast fermented alcoholic beverages is beer. Discussed hereinafter are some of the shortcomings associated with known methods of brewing beer. However, those skilled in the art will recognise that these shortcomings have relevance in equivalent techniques in producing cider, mead or wine.

Brewing beer through fermentation involves a process in which water and extract from grain and hops are fermented with yeast in a fermentation vessel. During the fermentation process the yeast acts on the extract from the grains and produces ethanol, carbon dioxide and flavouring chemicals. The ethanol and flavouring chemicals remain in the beer but the $CO_2$ is emitted out of the vessel. Thus after fermentation the beer is flat and non-carbonated and requires post-fermentation carbonation. After fermentation the yeast usually flocculates down to the bottom of the fermenting vessel and needs to be separated from the beer to avoid yeasty off-flavours being absorbed into the beer. On the small scale, many home brewers siphon the beer off the sediment into another vessel for maturation. The reason for this is that home brewers generally use small flat bottomed fermenting vessels. The maturation stage is ideally a cold period which may involve a clarification step using special clarifying agents such as gelatine and isinglass finings.

In all scales of brewing from large to homebrew scale, the beer is typically flat after fermentation and maturation. In order to carbonate the beer, large breweries recover the $CO_2$ emitted during fermentation into tanks and dose it back into the beer at filtration. Small breweries buy $CO_2$ in tanks and similarly dose it into the beer during filtration. Home brewers will either transfer the matured and clarified flat (non-carbonated) beer into kegs for forced carbonation from an external source prior to consumption (which takes about 5 days) or transfer it into bottles and add some sugar before sealing, for a natural secondary in-bottle fermentation and thus biological carbonation (by yeast) prior to consumption (which takes about 2 to 4 weeks). Where secondary fermentation in bottles is employed for the purposes of carbonation, it can be difficult as well as time-consuming to carbonate the beverage to the correct level. Under-carbonation may occur whereby the beverage is flat, or over-carbonation may occur, which can result in excessive foaming during pouring, or exploding bottles during storage. Such problems are well known and commonly experienced by home brewers.

For carbonation of draft (kegged) beer, which is equally as popular as bottled homebrew, home brewers need to pressurise the keg for about 5 days with $CO_2$ or a mixed gas (usually containing nitrogen and $CO_2$) from an external source, at a specific pressure depending on the temperature of the beer. The $CO_2$ gradually enters the beer until equilibrium is achieved and in this way the correct carbonation is obtained accurately, with more ease and in less time than in the case of bottled homebrew. The disadvantages of carbonating the beverage using an external source of $CO_2$ or mixed gas are that this method requires transferring of the beer which leads to a higher risk of oxygen uptake and microbial contamination. In addition, the source of $CO_2$ or mixed gas is not natural and may contain trace amounts of oxygen or other contaminants. Furthermore the carbonation step can involve a long time period (for example 5 days or more), and is generally inconvenient due to the effort and extra equipment required.

It can be seen that the traditional brewing route contains several steps where the beer is transferred from one receptacle to another. These transfers are time-consuming and increase the chance of infection from bacteria and wild yeasts. It also requires cleaning of lines and vessels before and after each step. Most importantly, these transfers have the disadvantage of introducing oxygen into the beer. The introduction of oxygen after the fermentation stage is very undesirable. Such contact promotes the formation of staling chemicals such as trans-2-nonenal, benzaldehyde and 2-furfural. Even a small amount of oxygen such as 100-400 parts per billion, as is present in a typical bottle of commercial beer after filling, can have a deleterious effect on beer and this is the main reason that commercial beer brands have a use-by date on their product.

Home or small scale brewers use siphon hoses and plastic buckets and usually cannot flush air out of such lines and receptacles with special de-aerated water or $CO_2$ flushes before transfers, as is the case in commercial brewing. Therefore oxygen pick-up is often extremely high (in the parts per million or milligrams per liter range) and very damaging.

The sensitivity of beer to processing damage after fermentation is so high, that the world's number one beer brand has a shelf-life stated on each pack of only 110 days, purely due to the fear that consumers will notice the oxidized flavours that form as beer ages and then switch loyalty to other fresher tasting brands. Even 50 parts per billion oxygen (50 micrograms per liter) in beer causes oxidation of the product over time.

For home brewing, unwanted infection by bacteria and wild yeast can also diminish the quality of the beer. Transfers from vessel to vessel require that all equipment such as all siphon hoses, tools, tanks, kegs and bottles used by the home brewer be properly cleaned and sanitised in order to avoid such infection. This need increases both the time and labour required by the hobbyist and the amount of cleaning chemicals required, which is more detrimental to the environment. Many home brewers have experience producing quality beer in a fermenter, only to ruin it by having an infection in a subsequent maturation vessel, draft beer vessel or bottle.

In addition, home brewers often experience problems of temperature control during fermentation, maturation and dispense. Many home brewers do not use any temperature control and this has a negative impact on the yeast performance, beer flavour and final beer clarity. Control to +/−0.2° C. at all stages of brewing is preferable when making beer at any scale.

So in summary, it can be seen that there are several factors that tend to reduce the quality of beer produced by home or small scale brewers. Firstly, almost all home brewers use vessels that are not pressure vessels, so the $CO_2$ produced during fermentation must be allowed to escape though an air-lock. The fact that carbonation is lost to atmosphere during fermentation means the beer is flat and requires a carbonation step of some kind after fermentation. This leads to more transferring of the beer which leads to a higher risk of oxygen uptake and microbial contamination. The carbonation step involves a long time period for both draft and bottled homebrew and carbonation control in bottles is extremely difficult. Secondly, temperature control during fermentation, maturation, clarification and dispense is also difficult and ideally requires both heating and refrigeration if beer of a professional quality is desired to be produced. Thirdly, in order to remove the sediment resulting from the brewing process, the beverage after fermentation is usually required to be transferred off the yeast, which leads to more handling, a greater risk of infection and an increase in oxygen pick-up which in turn leads to increased staling of the beer.

SUMMARY

It is an object of the invention to provide a combined brewing system for making alcoholic beverages through fermentation, and/or a method of making an alcoholic beverage using a combined brewing system that ameliorates at least one of the disadvantages or limitations of the known art or that at least provides the public with a useful choice.

In a first aspect the present invention can broadly be said to consist in a combined brewing system for brewing fermented alcoholic beverages at home or on a small scale, said system comprising a single vessel which is capable of being pressurized, wherein said vessel comprises:

a temperature control system to selectively control the temperature of the contents of the vessel, means for substantially separating and collecting any sediment from within the vessel and removing it from the vessel while the vessel is under pressure, means for regulating the pressure of the vessel to facilitate and control natural carbonation of the contents of the vessel resulting from fermentation, means for receiving compressed gas to facilitate dispense of the contents of the vessel and/or to maintain the natural carbonation level of the contents of the vessel, a draft dispense mechanism for drawing off the contents of the vessel, said vessel thereby being capable of accommodating at least the brewing steps of fermentation, natural carbonation, maturation, and draw off.

Such a system, when in use, ensures that the risk of contamination of the contents of the vessel by air and/or undesirable micro-organisms during brewing is minimized thereby producing an improved quality beverage.

Preferably the temperature control system comprises or includes a heating means, a refrigeration means and a temperature regulation device.

Preferably the heating means comprises or includes a heating element which is permanently or removably attached to one or more external surfaces of the vessel.

More preferably the heating element is permanently or removably attached to one or more external surfaces at or near the base region of the vessel.

Additionally or alternatively, the heating means may comprise or include a heating probe located within the vessel.

Preferably the refrigeration means comprises or includes a cooling unit which is permanently or removably attached to one or more external surfaces of the vessel.

Additionally or alternatively, the refrigeration means may comprise or include a cooling probe located within the vessel.

Preferably the vessel is capable of enabling one or more clarification agents to be added to the contents of the vessel after fermentation in a manner which minimizes contamination of the contents by air and/or undesirable micro-organisms.

Preferably the vessel is capable of enabling one or more clarification agents to be added to the contents of the vessel when the vessel is under pressure.

Preferably the means for substantially separating and collecting any sediment from within the vessel comprises or includes a tapered profile in the bottom region of the vessel which terminates with a dump valve which thereby enables the sediment to be removed from the vessel while the vessel is under pressure. More preferably the vessel includes a sediment collection container located under the dump valve that is used to collect any sediment whilst the vessel is under pressure.

Preferably the heating means of the temperature control system of the vessel is adapted such that it can be used to substantially sanitise the vessel before use using hot water and/or steam.

Preferably the vessel is capable of producing an alcoholic beverage which has an oxygen content of less than 30 parts per billion at consumption. More preferably, the oxygen content of the beverage is less than 10 parts per billion at consumption. Still more preferably, the oxygen content of the beverage is substantially zero at consumption.

In a further aspect the present invention can broadly be said to consist in a combined brewing system for brewing fermented alcoholic beverages at home or on a small scale, said system comprising a single vessel which is capable of being pressurized, wherein said vessel comprises:

means for substantially separating and collecting any sediment from within the vessel and removing it from the vessel while the vessel is under pressure, means for regulating the pressure of the vessel to facilitate and control natural carbonation of the contents of the vessel resulting from fermentation, means for receiving compressed gas to facilitate dispense of the contents of the vessel, and/or to maintain the natural carbonation level of the contents of the vessel, a draft dispense mechanism for drawing off the contents of the vessel, said vessel being capable of or adapted to be removably coupled with a temperature control system to selectively control the temperature of the contents of the vessel, the vessel thereby being capable of accommodating at least the brewing steps of fermentation, natural carbonation, maturation, and draw off.

Such a system, when in use, ensures that the risk of contamination of the contents of the vessel by air and/or undesirable micro-organisms during brewing is minimized thereby producing an improved quality beverage.

Preferably the temperature control system comprises or includes a heating means, a refrigeration unit and a temperature regulation device.

Preferably the heating means comprises or includes a heating element which is permanently or removably attached to one or more external surfaces of the vessel.

More preferably the heating element is permanently or removably attached to one or more external surfaces at or near the base region of the vessel.

Additionally or alternatively, the heating means may comprise or include a heating probe located within the vessel.

Preferably the refrigeration unit is adapted to substantially surround some or all of the external surfaces of the vessel when coupled with the vessel.

Preferably the refrigeration unit is in the form of a wrap-around jacket that is selectively removable from the vessel. Preferably the jacket has a refrigeration layer and an outer insulating layer and the refrigeration layer is directly adjacent to the external surfaces of the vessel when the jacket is closed around the vessel.

Alternatively the refrigeration unit is a cooling box which is adapted to house the vessel and wherein the vessel is able to be selectively placed in and removed from the cooling box.

Preferably the vessel is capable of enabling one or more clarification agents to be added to the contents of the vessel in a manner which minimizes contamination of the contents by air and/or undesirable micro-organisms.

Preferably the vessel is capable of enabling one or more clarification agents to be added to the contents of the vessel when the vessel is under pressure.

Preferably the means for substantially separating and collecting any sediment from within the vessel comprises or includes a tapered profile in the bottom region of the vessel which terminates with a dump valve which thereby enables the sediment to be removed from the vessel while the vessel is under pressure. More preferably the vessel includes a sediment collection container located under the dump valve that is used to collect any sediment whilst the vessel is under pressure.

Preferably the heating means of the temperature control system is adapted such that it can be used to substantially sanitise the vessel before use using hot water and/or steam.

Preferably the vessel is capable of producing an alcoholic beverage which has an oxygen content of less than 30 parts per billion at consumption. More preferably, the oxygen content of the beverage is less than 10 parts per billion at consumption. Still more preferably, the oxygen content of the beverage is substantially zero at consumption.

In a further aspect the present invention can broadly be said to consist in an alcoholic beverage produced using the combined brewing system or vessel as described in any one of the preceding statements, wherein the oxygen content of the beverage is less than 30 parts per billion at consumption. More preferably, the oxygen content of the beverage is less than 10 parts per billion at consumption. Still more preferably, the oxygen content of the beverage is substantially zero at consumption.

In a further aspect the present invention can broadly be said to consist in a combined brewing system comprising a vessel as described in any one of the preceding statements and a compressed gas tank.

In yet a further aspect the present invention can broadly be said to consist in a method of home or small scale brewing of fermented alcoholic beverages, wherein said method occurs in a single vessel and under temperature and pressure controlled conditions, and wherein said method comprises or includes at least the steps of fermentation, natural carbonation, maturation, and draw off.

Preferably, the method comprises or includes at least the following steps:
 a) adding the appropriate ingredients to the vessel;
 b) sealing the vessel;
 c) selecting the desired pressure setting to allow carbonation of the contents of the vessel to occur naturally as a result of fermentation;
 d) selecting the desired temperature setting for fermentation;
 e) allowing fermentation and natural carbonation to occur within the sealed vessel;
 f) cooling the contents of the vessel to the desired temperature;
 g) removing sediment from within the vessel while the vessel is under pressure;
 h) drawing off or dispensing the contents of the vessel directly from the vessel when the beverage is ready for consumption.

Preferably the method further includes one or more steps of clarification, which may occur before and/or after fermentation.

The cooling step allows for some degree of maturation of the beverage. However, optionally the method may include an additional step of maturation for any desired length of time. If an additional step of maturation is included, it may be accompanied by a simultaneous step of clarification.

Preferably the method further includes the introduction of a compressed gas from an external source to facilitate draw off or dispense of the contents of the vessel and/or to ensure that the carbonation levels of the beverage are maintained at the desired level until the contents of the vessel are fully drawn off or dispensed.

Preferably the method further includes a step of sanitisation prior to the step of fermentation. Preferably the sanitisation step includes the use of hot water and/or steam prior to the ingredients being added to the vessel.

Preferably the method involves a total processing time of from about 4 to 9 days depending on the type of beverage being produced.

Preferably the step of draw off involves dispensing the beverage into a drinking vessel ready for consumption. More preferably the beverage is dispensed directly from a tap located on the vessel into a drinking vessel.

In still a further aspect the present invention can broadly be said to consist in an alcoholic beverage produced by the method as described in any one of the preceding statements, wherein the oxygen content of the beverage is less than 30 parts per billion at consumption. More preferably, the oxygen content of the beverage is less than 10 parts per billion at consumption. Still more preferably, the oxygen content of the beverage is substantially zero at consumption.

The terms "brew", "brewing" and the like as used herein all refer to the production of alcoholic beverages through fermentation. Such terminology is not to be limited to the production of beer and should be interpreted to include the production of any other alcoholic beverages through fermentation such as wine, cider, mead and the like.

The term "small scale brewing" as used herein refers to brewing of beverages in volumes of from about 1 liter to about 2000 liters. This encompasses home brewing which usually involves brewing volumes of about 5 to 20 liters, but does not encompass commercial scale brewing which usually involves brewing volumes of greater than 2000 liters.

Throughout the description of this specification, the word "comprise" and variations of that word such as "comprising"

and "comprises", are not intended to exclude other additives, components, integers or steps.

BRIEF DESCRIPTION OF THE DRAWINGS

The invention will now be described, by way of example only, by reference to the accompanying drawings in which.

DESCRIPTION OF THE PREFERRED EMBODIMENTS

The following description will describe the invention in relation to preferred embodiments of the invention, namely a combined brewing system comprising a single vessel for making fermented alcoholic beverages such as beer, cider, mead or wine at home or on a small scale, and/or a method of making beer, cider, mead or wine in a single home or small scale brewing vessel. The invention is in no way limited to these embodiments as they are purely to exemplify the invention only and possible variations and modifications which would be readily apparent to a person skilled in the art are intended to be included in the invention without departing from the scope thereof.

The invention will be now described by way of example with reference to brewing beer as this alcoholic beverage is one of the more popular yeast fermented beverages. Those skilled in the art will appreciate that although this example relates to brewing beer, it can be applied to the equivalent techniques in the brewing of cider, mead, wine or other yeast fermented beverages. Accordingly, those skilled in the art will realise the nature of any modifications necessary where the vessel and method are to be used for brewing cider, mead, wine, or any other suitable yeast fermented beverages.

The invention is a system and/or method for brewing fermented alcoholic beverages at home or on a small scale. The system comprises a single vessel which is capable of being pressurized. The vessel comprises or is capable of being or adapted to be coupled with a temperature control system to selectively control the temperature of the contents of the vessel. The vessel further comprises means for substantially separating and collecting any sediment from within the vessel and removing it from the vessel while the vessel is under pressure, means for regulating the pressure of the vessel to facilitate and control natural carbonation of the contents of the vessel resulting from fermentation, means for receiving compressed gas to facilitate dispense of the contents of the vessel and/or to maintain the natural carbonation level of the contents of the vessel, and a pressure-regulated draw off mechanism or draft dispense mechanism for drawing off the contents of the vessel at a desired pressure. Accordingly the vessel is thereby capable of accommodating at least the brewing steps of fermentation, natural carbonation, maturation, and draw off. Such a system, when in use, ensures that the risk of contamination of the contents of the vessel by air and/or undesirable micro-organisms during brewing is minimized thereby producing an improved quality beverage.

The invention will now be described in more detail in the examples below with reference to FIGS. 1, 2 and 3.

EXAMPLE 1

Figure 1:
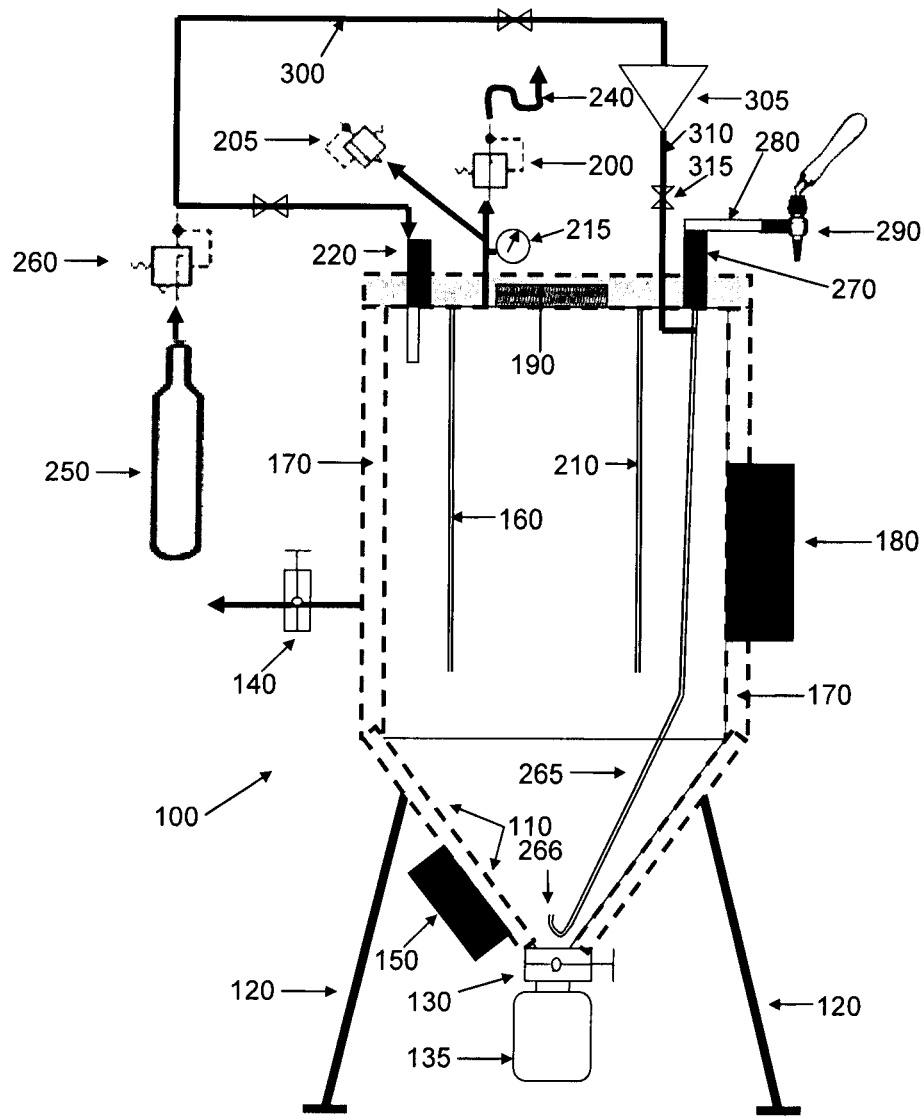
FIG. 1 is a schematic diagram of a combined brewing system in accordance with a first example of a preferred embodiment of the present invention.

FIG. 1 indicates one preferred embodiment of the invention and shows a pressurizable vessel which is generally referenced 100. To be pressurizable the vessel must be substantially sealable and be capable of withstanding higher pressures of around 1-3 bar as a minimum. In this example the vessel is made from stainless steel but a vessel made from suitable food grade materials, such as plastic materials, could also be used. To be suitable for use the vessel must be capable of withstanding pressure and incorporate a suitable safety relief system.

The vessel will have a sealable opening to allow materials to be added to the vessel such as cleaning agents or the fermentation ingredients. In FIG. 1 the opening is shown sealed with a removable lid 190 which is located on the top surface of the vessel. However the opening could be located at other suitable positions. Alternatively, the entire top portion of the vessel could be an opening defined by the upstanding walls of the vessel and be covered by a removable lid which seals the entire top surface of the vessel.

Here it will be seen that the vessel is supported by a plurality of legs 120 suitable to withstand the weight of the vessel and its contents when in use.

The vessel 100 may be of any volume, and a typical volume for a home brewing vessel would be 33 liters gross volume giving a net working volume of about 19 to 23 liters (US 5 gallons=19 liters and UK 5 gallons=23 liters). A larger size may be appropriate for a vessel that is intended to be used in premises such as bars or restaurants. In determining the volume of the vessel a 30% headspace should always be allowed for, due to foaming which occurs during fermentation from the production of natural $CO_2$ by the yeast.

Preferably the temperature control system comprises or includes a heating means, a refrigeration means and a temperature regulation device. In this example the heating means takes the form of a heating element 150 which could be a heat plate or a heat trace for example, attached to the vessel on its external surface. The heating element can be attached at any suitable location on the vessel but it is advantageous that it is located near the base region of the vessel so that the contents can be heated and thereby caused to rise and circulate within the vessel. For example, the heating element 150 could be a heat trace which is designed to encircle the external surface of the conical bottom of the vessel 100. The heating element 150 may be fixed in place or be selectively removable to enable the vessel to be more easily handled during filling and cleaning.

In addition to, or instead of heating element 150, a heating probe 160 may be used. The heating probe in this embodiment is located within the vessel 100 and will assist in heating the contents of the vessel. The vessel 100 may also have an insulating layer 170 to assist in keeping its contents at any desired temperature.

The refrigeration means 180 may take any form. In this example, a cooling unit such as a Peltier device or glycol unit or similar might be used and is attached externally to the vessel 100, for example, to one of the side walls of the vessel. In addition to, or instead of the cooling unit 180, a cooling probe 210 located within the vessel may be used. The refrigeration means 180 may be fixed in place or be selectively removable to enable the vessel to be more easily handled during filling and cleaning.

The vessel in this example is coupled with a pressure regulator 200 to facilitate and control the natural carbonation levels of the contents of the vessel resulting from fermentation. The pressure regulator 200 allows any excess carbon dioxide gas ($CO_2$) to flow out during fermentation into an air-lock 240 and then out to the atmosphere. The pressure regulator 200 may be set prior to fermentation to a predetermined set-point, or be set before the end of fermentation to a certain pressure as read on pressure gauge 215, to retain a desired amount of carbon dioxide in the final product. The pressure relief valve 205 acts as a safety relief valve regardless of the variable setting of pressure regulator 200.

The amount of carbonation desired will depend on the type of beer being produced. Thus all beer types can be made with this system, from low carbonated English ales to highly carbonated German Weiss beers.

Natural carbonation is also preferable to forced carbonation from external $CO_2$ sources as it follows the famous German purity law of 1516, The Reinheitsgebot, which states that beer should be made only from malt, hops, yeast and water. This law dictates that the $CO_2$ in the final beer must come from the fermentation itself, not $CO_2$ bottled by other breweries or industries as occurs when beer is forced carbonated from a $CO_2$ cylinder.

The vessel contains means for substantially collecting and substantially separating any sediment from within the vessel and removing it from the vessel while the vessel is under pressure. In this embodiment such means comprises of a tapered profile 110 in the bottom region of the vessel. The tapered profile 110 may terminate with a dump valve 130 which thereby enables the sediment to be removed from the vessel.

Preferably the vessel may include a sediment collection container 135 located under the dump valve 130, which is used to collect any sediment whilst the vessel is under pressure. The sediment collection container 135 may be a bottle or any other appropriate container. In use, once the solids have sedimented into the sediment collection container 135 at the end of the brewing process, the dump valve 130 is closed and the sediment collection container 135 is removed just prior to consumption of the beverage. The sediment collection container 135 can be insulated with for example, a removable neoprene cover, to maintain temperature when attached to the vessel during the brewing process.

Other means for collecting and substantially separating the sediment from the remaining contents of the vessel might instead be utilized without departing from the spirit or scope of the invention.

The vessel should contain means for receiving a compressed gas during dispense of the beverage. In this example the means for receiving a compressed gas is provided in the form of a gas inlet port 220. In use, following cooling of the beverage, a compressed gas cylinder 250 is connected to the vessel 100 via the gas inlet port 220 at a pressure that is set using a regulator 260. The compressed gas cylinder 250 may contain $CO_2$ or a mixed gas (for example $CO_2$ and nitrogen in a ratio of, for example, 70% to 30%). The compressed gas will only be introduced to the vessel at a predetermined amount at a predetermined stage of the brewing process, namely when the contents of the vessel have been chilled and are ready for dispense.

The compressed gas has two functions. Firstly, it facilitates dispense of the contents of the vessel by enabling the beverage to be pushed out of the tap, or draw off mechanism. Secondly, it enables gas or natural carbonation levels in the beverage to be maintained at a desired level. The compressed gas is not used to carbonate the beverage. Rather, the compressed gas cylinder 250 and regulator 260 maintain the natural carbonation levels already present in the beverage until the contents of the vessel are completely consumed, or the vessel is completely emptied of its contents. For example, the beverage after fermentation and chilling may contain, for example, 5 g/l natural $CO_2$ depending on the pressure setting selected during fermentation and the fermentation temperature selected. The headspace in the vessel will also contain $CO_2$ and the gas present in the beer and headspace will be in equilibrium, such that there is no exchange of $CO_2$ between them. The pressure in the headspace will be about 0.7 bar at 2° C. for 5 g/l $CO_2$ in the beer. In order to maintain the 5 g/l $CO_2$ in the beer until the last liter is dispensed from the vessel, the headspace must always be at a pressure of 0.7 bar. This is achieved by connecting the gas cylinder 250 to the vessel and setting the regulator 260 to a set pressure of 0.7 bar, so that when the draft dispense mechanism is opened, the beverage is dispensed and $CO_2$ or mixed gas from the gas cylinder 250 enters the headspace as the beverage level drops, thus maintaining the 0.7 bar pressure in the headspace. Accordingly, the natural carbonation present in the remaining beverage will stay in the beverage and the introduced external $CO_2$ or mixed gas will remain in the headspace above the beverage due to the equilibrium pressure from the natural $CO_2$ levels present in the beverage. If the pressure in the headspace was not maintained in this manner, the beverage would go flat as the contents of the vessel dropped, due to the $CO_2$ present in the beverage (from the natural carbonation) moving out of the beverage into the headspace to maintain the equilibrium between the beverage and the headspace. Thus the external compressed gas will (a) facilitate dispense of the beverage when the draft dispense mechanism is opened and (b) maintain both pressure in the headspace and the natural carbonation level in the beverage without entering the beverage, which would otherwise increase the carbonation level.

The pressure-regulated draw off mechanism or draft dispense mechanism for drawing off the contents of the vessel at a predetermined pressure can be provided in many forms. The contents may simply be drawn off so that they are transferred into another container or most ideally, the contents will be drawn off into a drinking vessel for immediate consumption. Various means can be used to achieve draw off provided that they result in the alteration of the pressure of the contents of the vessel from what they are subjected to in the vessel to a lower pressure when the contents are released from the vessel.

In this example, the vessel is adapted to enable draw off directly into a drinking vessel for consumption and the draw off mechanism is adapted to provide a good pour, without excess speed, which could otherwise cause over-foaming in the drinking vessel. Accordingly the draw off mechanism consists of a beer outlet line 265, beer outlet port 270, flow compensator 280 and draft beer tap 290. These features may be fixed in place or be selectively removable to enable the vessel to be more easily handled during filling and cleaning. The pressure from the connected compressed gas cylinder 250 is used to push the beer through the draw off mechanism when consumption is desired.

The flow compensator 280 allows the brewer to maintain a high pressure in the vessel 100 for beers that require high $CO_2$ levels (for example, German wheat beers) without the problem of over-foaming during pouring through the draft beer tap 290. It allows all beers to be poured at for example 0.14 bar (2 PSI) at the tap even if they are pressurized to, for example, 1 bar (14 PSI) or more in the vessel. Thus many styles of beer can be produced with varying levels of $CO_2$ but poured out at a suitable rate to prevent over-foaming.

An alternative pressure regulated draw off mechanism is provided in the form of a beer outlet line 265 having a spiralled profile at the point close to where it connects with beer outlet port 270 (not shown in FIG. 1). A spiralled profile in the beer outlet line 265 would lengthen the line and reduce the pressure at the tap to allow draw off at a desirable pressure. Several different beer outlet lines 265 would then be made available for different beers (for example lager, ale and wheat beer) and one would be selected and inserted before cleaning and sanitisation of the unit, depending on the beer being produced. In this case, flow compensator 280 would not strictly be necessary.

Preferably the vessel is adapted to enable one or more clarification agents to be added to the contents of the vessel. The clarification agent(s) could be added either before or after fermentation in order to reduce protein haze. If the clarification agent(s) is added after fermentation, then preferably the vessel is adapted to enable the clarification agent(s) to be added in a manner which minimizes contamination of the contents of the vessel by air and/or undesirable micro-organisms. Accordingly, the vessel should ideally be capable of enabling one or more clarification agents to be added to the contents of the vessel when the vessel is under pressure.

This can be achieved by using a small dosing vessel (e.g. 200-300 ml) containing the clarifying agent(s) and attaching it to the gas inlet port 220 at one end and at the other end to the compressed gas cylinder 250 via regulator 260 so that the gas pressure from the compressed gas cylinder 250 forces the clarification agent into the pressurised vessel, without the need to de-pressurise and open the vessel. The brewing vessel can then be rotated to mix the clarification agent through the beer.

More preferably however, this can be achieved by using a small dosing vessel 305 (e.g. 200-300 ml) containing the clarifying agent(s) and attaching it to the beer outlet line 265 at one end via a dosing line 310 (with a one way valve 315 inserted to avoid back-flow of beverage) and at the other end to the compressed gas cylinder 250 via regulator 260 and gas line 300 so that the gas pressure from the compressed gas cylinder 250 forces the clarification agent into the pressurised vessel, without the need to de-pressurise and open the vessel. The beer outlet line 265 preferably has a hooked end 266 which allows the clarification agent to enter the bottom of the vessel and shoot up vertically and therefore create a mixing effect to mix the clarification agent into the beverage within approximately 5-10 seconds.

In order to remove any oxygen which may be present in the clarifying agent(s) itself, before adding the agent(s) to the vessel, the agent (e.g. 20-50 ml) could be added to a small amount of boiling water (e.g. 200-300 ml) which drives off oxygen and sterilises the agent. Alternatively, the oxygen content of the agent(s) could be reduced by bubbling $CO_2$ through the agent from an external $CO_2$ source or the compressed gas cylinder 250.

Clarification agent(s) added prior to fermentation to remove haze proteins eliminates the need for this step after fermentation in most instances, depending on the brewer's preferences.

Preferably the vessel is adapted to be able to be substantially sanitised using hot water and/or steam before use. This can be accomplished by (a) adding boiling water from an external source to the vessel prior to use, or (b) by adding water to the vessel and heating it using the heating element 150 or heating probe 160, or (c) by adding water to the vessel and heating it using an immersible heating element such as a heat stick. Accordingly, the vessel 100, together with its associated parts, should be capable of withstanding temperatures of around 80 to 100° C.

The vessel 100 may be adapted to carry a sample valve 140 which is used to test the contents of the vessel mainly during fermentation. Sample valves suitable for this purpose are well known in the art and therefore are not further described. Alternatively it is possible to sample the contents of the vessel during fermentation and maturation by opening the beer tap 290 and drawing off a small portion of the beer.

EXAMPLE 2

Figure 2:
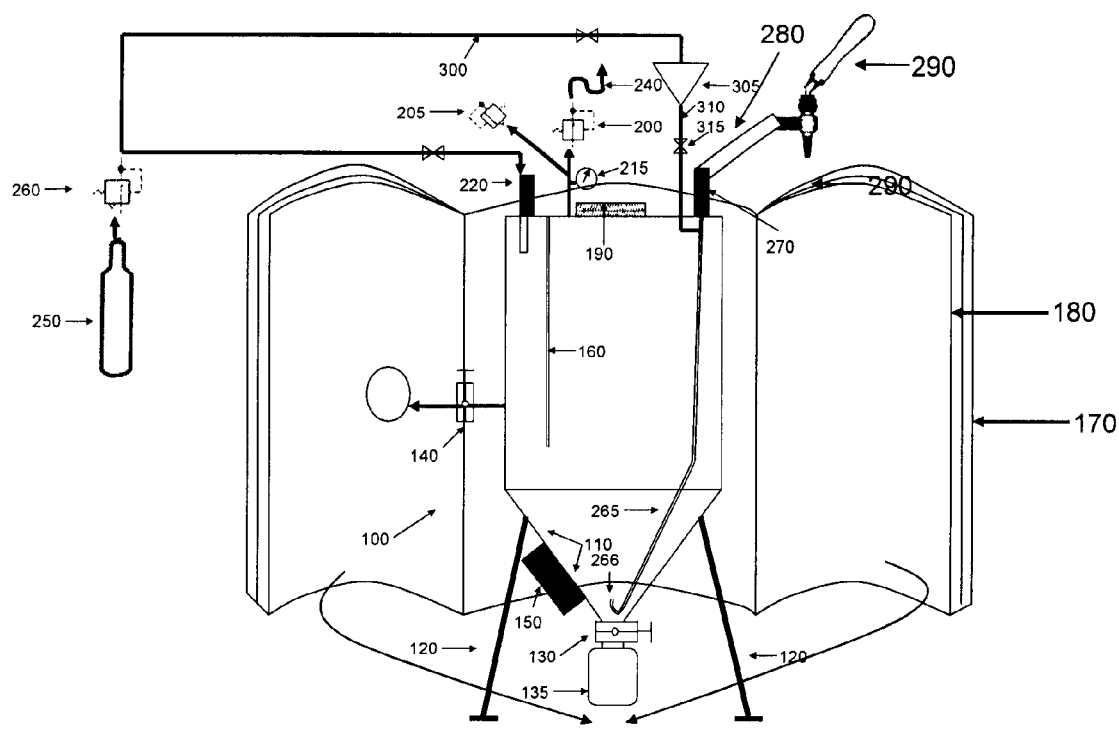
FIG. 2 is a schematic diagram of a combined brewing system in accordance with a second example of a preferred embodiment of the present invention.

FIG. 2 shows an alternative embodiment of the invention wherein the refrigeration unit of the temperature control system is selectively and removably attachable to the body of the vessel. In this embodiment, the refrigeration unit is a wrap-around unit. This arrangement has the advantage of allowing the main vessel to be separated from the refrigeration unit making the vessel lighter and easier to handle during cleaning and filling.

The refrigeration unit takes the form of a jacket having a refrigeration layer 180 which is preferably surrounded by an insulation layer 170. The refrigeration layer 180 will contain a refrigerant such as glycol or a Peltier device but any suitable refrigeration method can be used. In this option the refrigeration layer 180 is directly adjacent to the walls of the vessel 100 when the refrigeration unit is closed around the vessel.

FIG. 2 shows diagrammatically the vessel 100 and jacket when the jacket is opened for removal of the vessel. The jacket will typically be designed to hug the walls of the vessel 100 so that when closed, more efficient refrigeration is achieved. The jacket can be in any suitable form but it is most likely to be a solid structure to protect the internal refrigeration components.

The jacket can be clamped shut in the closed position but the sample valve 140 will still be useable through a designed hole in the jacket. Gas inlet port 220 (and associated components), beer outlet port 270 (and associated components), and pressure regulator 200 (and associated components) are located outside of the refrigeration unit so they are easily made use of when the jacket is in the closed position. The legs 120 of the vessel may still be retained on the vessel.

With this embodiment of the invention it is possible to selectively remove the refrigeration unit or jacket from the vessel 100 so that the vessel 100 can be carried elsewhere (for example to clean it) and then return it to the refrigeration unit or jacket which is re-closed around the vessel and clamped in place (to ensure efficient temperature control).

EXAMPLE 3

Figure 3:
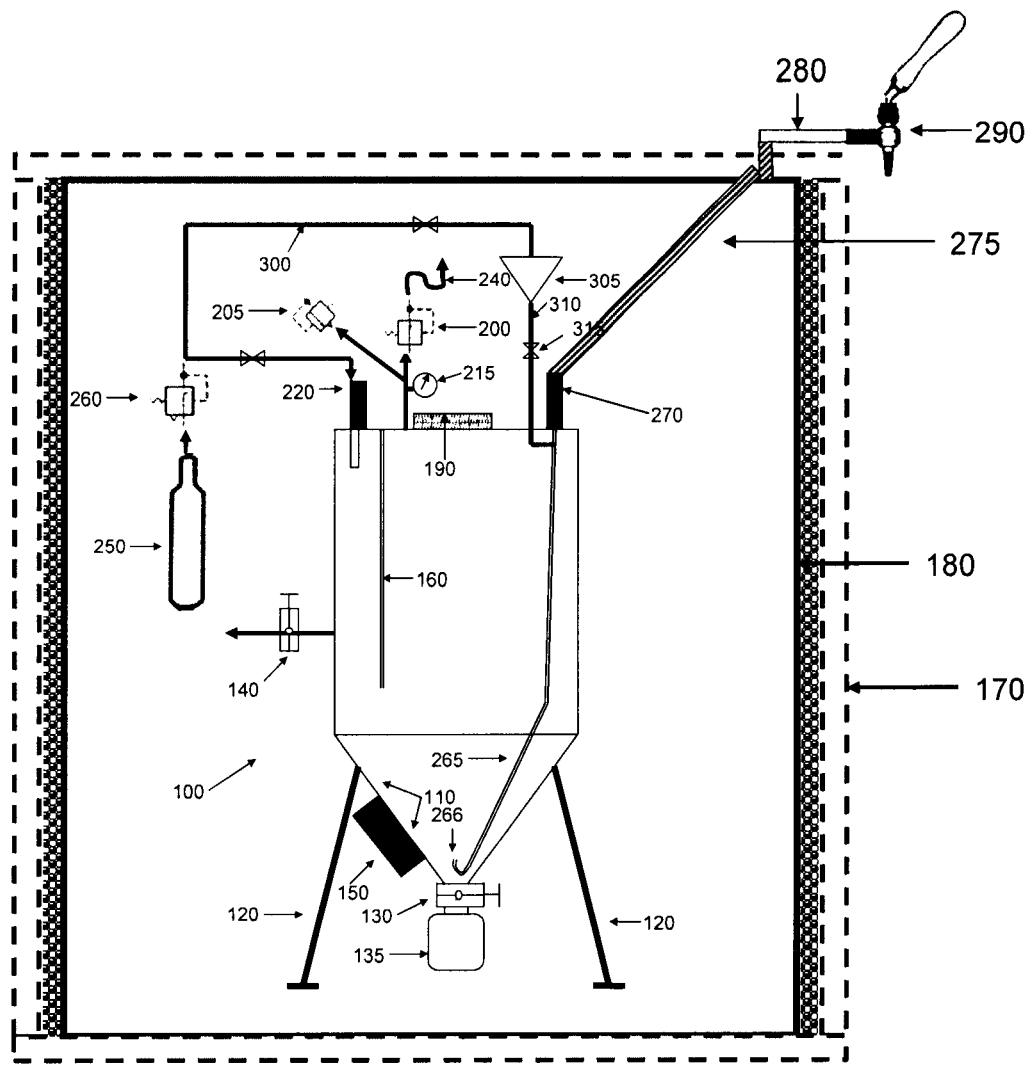
FIG. 3 is a schematic diagram of a combined brewing system in accordance with a third example of a preferred embodiment of the present invention.

FIG. 3 shows a further example of an alternative refrigeration mechanism. Here, the refrigeration unit is not directly adjacent to one or more of the walls of the vessel as seen in Examples 1 and 2 but instead is a cooling box that the vessel is placed in. In this embodiment the flow compensator 280 and draft beer tap 290 are placed on the outside of the cooling box (which comprises of a refrigeration layer 180 and an insulation layer 170) and a connecting pipe or hose 275 is used to supply the tap 290 with the beverage from the vessel 100.

A door (not shown) enables the vessel 100 to be removed from the cooling box for cleaning or filling or for a sample to be taken during processing. The cooling box will keep the internal air at a controlled temperature which will in turn maintain the desired temperature of the beverage inside the vessel 100.

It should be noted that from a beverage quality point of view, as long as the beverage temperature within the vessel 100 is controlled within a range (for example, +/−0.2° C. from a set-point) then the beer quality will be high and match commercial methods regardless of refrigeration embodiments used as shown in FIG. 1, 2 or 3.

Method of Use

In light of the above description, the operation of the brewing vessel 100 will now be described with reference to brewing beer. It will be appreciated by those skilled in the art that there are many ways in which beer may be brewed, and many brewers, both amateur and professional, have their own particular idiosyncrasies.

Some home brewers of beer make sweet wort from grains and hops (hereinafter referred to as "all-grain brewers") whereas others use a prefabricated malt extract (hereinafter referred to as "extract brewers"). A prefabricated malt extract is typically made by a professional company and will be provided in a can as liquid malt extract (LME, being 80% solids) or in a bag as dry malt extract (DME, being 98% solids).

For the sake of clarity a basic use of the vessel 100 and method will be described for both all-grain and extract brewers. The quantities stated are appropriate to a vessel 100 of approximately 33 liters gross volume and a net working volume of approximately 19 to 23 liters (US 5 gallons=19 liters and UK 5 gallons=23 liters). The method is particularly focused on ensuring that no bacteria or wild yeast infection occurs during production. This is achieved, in part, by ensuring that the vessel is sanitised with heat and that all water used is boiled and all ingredients (except the yeast) are boiled or at least pasteurised by heat when combined with hot boiled water.

The vessel should firstly be cleaned and sanitised. The vessel is preferably soaked or sprayed with a special cleaning solution to dissolve organic and mineral matter from the walls of the vessel, the dump valve 130 and sample valve 140 (if present). This cleaning solution is then forced to flow through the beer outlet line 265, beer outlet port 270, flow compensator 280 and draft beer tap 290 by connecting to the external $CO_2$ supply or compressed gas cylinder 250. The cleaning solution is then removed from the vessel via dump valve 130 and sample valve 140 (if present). Tap water is then used to flush the vessel 100, dump valve 130, the sample valve 140 and the beer outlet line 265, beer outlet port 270, (connecting hose 275 in case of the embodiment in FIG. 3), flow compensator 280 and draft beer tap 290 in a similar manner. The sediment collection container 135 can be cleaned in a standard household dishwasher then re-attached prior to sanitation of the vessel.

For all-grain brewers, the vessel should then be heat sanitised before addition of the wort. This can be accomplished by (a) adding boiling water from an external source to the vessel, or (b) by adding water to the vessel and heating it using an immersible heating element such as a heat stick, or (c) by adding water to the vessel and heating it using the heating element 150 or heating probe 160. If using the heating element 150 or probe 160, water is filled to a level to cover the external heating element 150 or internal heating probe 160 and is then boiled to steam the entire vessel 100, dump valve 130 and sample valve 140 (if present). With each of these methods, the hot water should then be flushed through the beer outlet line 265, beer outlet port 270, (connecting hose 275 in case of the embodiment in FIG. 3), flow compensator 280 and draft beer tap 290 by connecting to the external $CO_2$ supply or compressed gas cylinder 250 until the water is removed from the vessel. During this, the air-lock 240 is connected to the pressure regulator 200, and the pressure set-point is set to zero, so that steam will flow though the pressure regulator 200 and the air-lock 240. Alternatively cold water with added sanitising agent could be used to sanitise the vessel and its parts and then dumped.

After the vessel is sanitised the wort produced by the all-grain home brewer can then be added to the empty and sanitised vessel.

In the case of extract brewing, the bulk of the water used to make the wort is used to sanitise the vessel prior to mixing with the extract, in a similar method as described above for all-grain brewers. However, in this case, the water volume will be larger and the water will be retained in the vessel and cooled to an appropriate temperature after sanitisation is complete (to this cooled water will be added hot dissolved extract and hops which will combine to provide an optimal temperature of about 20-25° C. for yeast addition).

In both cases, by sanitising the vessel as described above as well as the fact that the vessel enables all of the steps of fermentation, maturation, carbonation and draw off to occur within the single vessel, means that unwanted infection from poor cleaning of brewing vessels and tools and transfer lines, will be avoided or at least significantly reduced.

The sweet wort and the yeast may then be added to the vessel. For all-grain brewers, the sweet wort that the brewer has made from the grains and hops is added to the vessel to the desired volume. Because the sweet wort has been boiled by the brewer, the risk of infection is low. The cleanliness and heat sanitation of the vessel further reduces the chance of infection.

For malt extract brewers, the extract is dissolved in hot boiled water in a kitchen pot and added to the bulk (previously heated and cooled) sanitised water in the vessel. Thus the resulting temperature is around room temperature and acceptable for addition of the yeast.

Clarification agent(s) may also be added at this stage prior to fermentation to remove haze proteins. This may eliminate the need to clarify the beer after fermentation. In this case, the clarification agent(s) does not need to be purged of oxygen but only sanitised in boiling water before adding.

The extract itself is pasteurised when dissolved in the hot water, which kills any undesirable bacteria that may be present in the extract.

Once the all-grain brewer or malt extract brewer has added the sweet wort (and optional clarification agent(s)) to the cold water to achieve a final wort temperature similar to the ambient temperature of the yeast (within 5° C.), the yeast is added. The yeast can be either dry yeast or liquid yeast. For liquid yeast, it is also considered preferable by many home brewers to make a yeast starter. A yeast starter is a small volume of wort of usually 1-2 liters which has dry or liquid yeast added to it in advance of the main wort production in order to activate the yeast. Starters are usually made one day before main wort production, in order to provide healthy and active yeast to the main wort. If a starter is used, the main wort volume should be reduced to allow for the volume of the starter. Ideally the brewer should ensure that both the main wort and yeast are at a temperature of about 20-25° C. when they are added together in the vessel in order to avoid temperature shock to the yeast. Dry yeast does not require such as starter due to the greater resistance of dry yeast to cellular energy depletion during storage.

Following the addition of the yeast, from this point onwards, the procedure is the same for both types of home brewers, that is, from fermentation through to consumption. Thus all ingredients have been added to the vessel 100 and the volume in it will be about 20 liters.

The vessel 100 should then be sealed with the removable lid 190. The temperature is set to the desired fermentation temperature using either the heating means 150 and/or 160 or the refrigeration means 180 and/or 210, and the pressure regulator 200 is set to maintain the desired pressure in order to achieve accurate natural carbonation of the beer during fermentation. Most ales are fermented at 20-25° C. whereas lagers are fermented in the range of 9-14° C. For example, should a Heineken type drink be desired, the fermentation must be carried out at about 11+/−0.2° C. A change in wort temperature at this point from room temperature to for example 11° C. will not shock the active yeast in the wort, as the temperature change occurs gradually over several hours until the fermentation temperature set-point is reached.

Either before or during fermentation, the pressure regulator 200 is set to retain the desired amount of carbon dioxide in the final product. For example, for fermentation at 20° C. the pressure regulator 200 would be set at about 2 bar pressure in order to carbonate the beer to typical levels of carbonation in finished beers. During fermentation, due to the pressure, natural carbonation will be retained in the beer. Excess $CO_2$ will be released to atmosphere during the remaining part of fermentation, once the desired level is reached in the liquid. Therefore there is no need for an external source of carbonation (as typically occurs in other brewing methods) to be used. This is a major advantage of this brewing system as the carbonation step in other brewing systems can take between 5 days to 4 weeks depending on the method employed. In this system carbonation occurs during fermentation so takes no additional time after fermentation.

After the appropriate fermentation period (around 3-8 days after adding the yeast) the contents of the vessel are then chilled to the desired temperature at which the beverage is desired to be consumed, for example, between 0° C. to 7° C. This is accomplished by setting the temperature control system to the desired temperature. This cooling step allows for some degree of maturation of the beverage to occur since it promotes the formation of chill haze, which is produced by a physical reaction between proteins and polyphenols that are naturally present in the beer. This chill haze will settle into sediment and will therefore help to clarify and thus mature the beverage. The cooling step further promotes the sediment of the yeast which further helps to clarify and mature the beverage. Most yeast will sediment over 1-2 days once cold. After the contents of the vessel are cooled to the desired temperature, the sediment including the yeast sediment is removed from the vessel while the vessel is still under pressure, either by opening the dump valve 130, or if a sediment collection container 135 is used, by closing the dump valve 130 and removing the sediment collection container 135. The removed yeast can be retained for future fermentations.

A clarification agent (volume of around 20-50 ml added to, for example, 200 ml of hot water to remove oxygen and to sanitise) may then be added to the contents of the vessel 100 to clarify the product further by helping to sediment the bulk of both remaining yeast and remaining chill haze. This can be achieved by using a small dosing vessel (e.g. 200-300 ml) containing the clarifying agent and attaching it to the gas inlet port 220 at one end and at the other end to the compressed gas cylinder 250 via regulator 260 so that the gas pressure from the gas cylinder 250 forces the clarification agent into the pressurised vessel, without the need to de-pressurise and open the vessel. The small dosing vessel is then disconnected and the still sealed and pressurised vessel 100 is rotated by hand to mix the clarification agent into the beer. Alternatively (and preferably), this can be achieved by using a small dosing vessel 305 (e.g. 200-300 ml) containing the clarifying agent(s) and attaching it to the beer outlet line 265 at one end via a dosing line 310 (with a one way valve 315 inserted to avoid back-flow of beverage) and at the other end to the compressed gas cylinder 250 via regulator 260 and gas line 300 so that the gas pressure from the compressed gas cylinder 250 forces the clarification agent into the pressurised vessel, without the need to de-pressurise and open the vessel. The beer outlet line 265 preferably has a hooked end 266 which allows the clarification agent to enter the bottom of the vessel and shoot up vertically and therefore create a mixing effect to mix the clarification agent into the beverage within approximately 5-10 seconds.

It is certainly preferred that the clarification agent is free from oxygen and/or other contaminants. This is accomplished by choosing an agent that can be dissolved in boiled water, which will then contain practically no oxygen due to the low dissolution of oxygen in hot water. In addition, $CO_2$ from the gas cylinder 250 can be bubbled through the small amount of clarification agent in the special dosing vessel to strip any remaining oxygen away. In this way, a clarification agent free from oxygen can be added to the vessel whilst it is still under pressure. Accordingly the resulting beer will still contain practically zero parts per billion oxygen when consumed.

Sediment which is brought about by the clarification agent(s) reacting with both yeast and haze particles can be removed either by opening the dump valve 130, or if a sediment collection container 135 is used, by closing the dump valve 130 and removing the sediment collection container 135. The beer is then ready to drink and be enjoyed.

Note that clarification agent(s) may be added prior to fermentation or even not at all, depending on the preferences of the brewer. Clarification does not affect flavour so much as appearance.

If performed correctly, the method of brewing an alcoholic beverage as described above using the vessel or system as described herein will produce a beverage having the lowest levels of contamination by oxygen provided by a brewer at any scale of volume to date. The oxygen levels of the beverage post fermentation or at consumption will be practically zero, or less than 30 parts per billion. For example, if the optional post-fermentation clarification step is carried out then the oxygen content of the beverage will be between about 0-30 parts per billion at consumption. If no post-fermentation clarification step is carried out then the oxygen content of the beverage will be between about 0-10 parts per billion at consumption. The beverage will therefore be of very high quality.

If performed correctly, the method of brewing an alcoholic beverage as described above using the vessel or system as described herein will involve a minimum of labour time. The preparation time or work involved to clean the vessel and prepare the beverage for brewing may be as little as 1 to 2 hours. In addition, the total processing time from the beginning of the process until the beverage is ready to be consumed is very short. For example, using the method of brewing with extract wherein hot water is added to the vessel first and then cooled, the total processing time will be approximately 6 days for brewing of ales, and approximately 9 days for brewing of lagers. This includes sanitisation (about 1 hour) and cooling time (about 1 day), preparation time (about 1-2 hours), fermentation (about 3-6 days), carbonation (which occurs naturally), and cooling of the beverage (about 1 day), and allows for 1 day of clarification if the optional post-fermentation clarification step is employed. Accordingly, if the post-fermentation clarification step is not employed, the total processing time could be as little as 5 days for brewing of ales, and 8 days for brewing of lagers. However, if all grain brewing is utilised rather than extract brewing, then the total processing time could be as little as 4 days for ales and 7 days for lagers since no cooling time is required after sanitisation, thereby reducing the total processing time for all grain brewing by about 1 day.

It should be noted that it is optional for the brewer to allow for a longer maturation period if desired (for example, some brewers may wish to mature the beverage for several weeks), however this is not necessary. Long maturation periods originate from a time before industrial refrigeration and clarification agents were used, and beers were kept in caves and cellars for many months in order to clarify. However, from a flavour perspective, maturation does not have a significant effect on the flavour of the beverage. By using clarification agents and temperature control to provide refrigerated cold storage, both of which help clarify the beverage very quickly and thus allow for some degree of maturation of the beverage, the present invention enables the beverage to be ready for consumption very soon after fermentation has been completed. In addition, given that the present invention is for use in home brewing or small scale brewing, the size of the vessel is small which allows for fast sedimentation of yeast and haze materials and therefore fast clarification. Accordingly, a longer maturation period is not required with the present invention, however any period of maturation can of course be employed if desired by the brewer.

ADVANTAGES

The vessel and method of the present invention has a number of advantages over prior art home or small scale brewing vessels and/or methods. Examples of these advantages are outlined below.

The present invention combines the brewing steps of fermentation, natural carbonation, maturation, and draw off into a single vessel and therefore eliminates all handling and transfers post-fermentation that currently occur in existing brewing techniques at any scale of volume.

The present invention eliminates the need to force carbonate the beverage using an external gas source. By doing so, it reduces the time-frames currently associated with forced carbonation of draft beverages. In existing systems, after fermentation the contents are near flat due to practically all of the carbon dioxide produced during fermentation escaping to the atmosphere though an air-lock. The contents are typically placed in a keg, such as a Cornelius keg, and carbonation is achieved by connecting a supply of carbon dioxide to a fitting on the top of the keg and maintaining a certain pressure over the contents of the keg for about five days while the keg is kept in a fridge. Alternatively some home brewers bottle the flat beverage after fermentation and add sugar to each bottle, seal the bottles and leave them for a period of about two to four weeks for secondary fermentation and carbonation to take place.

The present invention obviates the need for this five day to four week waiting period, as the pressure regulator on the vessel allows the brewer to trap carbon dioxide in the beverage during fermentation to precisely the desired amount for the type of beverage being produced. Any excess $CO_2$ is emitted to atmosphere during the remaining fermentation period. Thus once the beverage is cooled and clarified, it is ready to drink. Accordingly, the total time taken for producing draft homebrew can now be greatly reduced compared to the existing techniques employed. Using this system, beer can be consumed cold and perfectly carbonated straight from the vessel after a minimum period of 4 days following the addition of the yeast to the wort (dependent on the fermentation temperature and yeast used). An external source of carbon dioxide is used only to facilitate dispense of the beverage from the vessel and to maintain the natural carbonation level in the beverage until the contents of the vessel are fully dispensed.

In addition, the carbonation level can be adjusted to suit any beer style by adjusting the pressure regulator to control natural carbonation. Thus low carbonated English ales can be made or highly carbonated German Weiss beers. The flow compensator before the draft beer tap allows for dispense at the draft beer tap regardless of the carbonation level of the beverage (i.e. pressure in the vessel).

In addition, the pressure regulator, which allows for natural carbonation, allows the home brewer to produce a beverage which follows the German purity law of 1516 known as The Reinheitsgebot. This law states that you can only use malt, hops, yeast and water for making beer. The carbonation must therefore come from the fermentation itself, not from an external source of carbon dioxide. Although this law has since been repealed, it is famous amongst brewers worldwide as a high quality standard in beer production. The use of forced carbonation from an external $CO_2$ source does not provide this level of purity as the $CO_2$ source could be a by-product from one of many industries, including the sugar and oil industries, and could contain contaminants. It should be noted that the use of clarification agents also follows The Reinheitsgebot as they are removed from the beer after use and before consumption and are not considered as additives.

Another advantage of the present invention is that no bottling is required. As mentioned above, many home brewers use bottles in a secondary fermentation step to achieve carbonation. The present invention removes the necessity for this secondary fermentation step with a consequent saving in time sterilising and filling bottles, and a reduction in the risk of contamination.

The present invention also has the advantage of better controlling carbonation so there is no production of flat product or over-foaming beer or exploding bottles.

As the contents of the vessel are not required to leave the vessel until dispense or consumption, there is little or no oxygen pick-up after fermentation. The yeast consumes the oxygen in the wort for its own cellular growth prior to fermentation and the $CO_2$ produced during fermentation also strips oxygen from the beer. Accordingly, due to the elimination of transfers and packaging into kegs or bottles, the beer made in this system will have the lowest levels of contamination by oxygen provided by any brewing system at any scale of volume to date, and if the method of brewing is performed correctly, the oxygen levels of the contents post fermentation and at consumption will practically be zero. The result is that the flavour shelf-life will be extremely long and the initial freshness very high and noticeable and most likely better than beer made by commercial brewers, as measured by the common oxygen-induced staling chemicals in the beer, such as trans-2-nonenal, benzaldehyde and 2-furfural.

In addition the present invention reduces the risk of spoilage of the contents by contamination with bacteria, wild yeasts or moulds because of the elimination of the need to transfer the contents during the brewing process. The use of a hot water and/or steam sanitisation step on all surfaces and parts of the vessel further ensures that the risk of contamination is significantly reduced. Reducing the risk of spoilage is a significant advantage, as most home brewers are not qualified microbiologists and struggle to keep all equipment and vessels completely free of contaminants. Contamination is a major source of concern as it results in infected and subsequently hazy and sour beverages.

By eliminating the need to transfer the contents through several vessels, the present invention also has the advantage of saving a large amount of processing time and labour currently required by the home brewer.

Yet another advantage of the present invention is that the reduction in cleaning chemicals associated with the need to clean only one vessel instead of three vessels (plus the equipment associated with transfers), saves the home brewer both time and cost. The reduction in quantities of cleaning chemicals required also reduces damage to the environment.

Another advantage of the present invention is that due to its ability to control the temperature of the contents of the vessel, it can be used in a variety of climates and reliably deliver high quality beverages. The desired temperatures during processing can be maintained during cold winters and hot summers. Due to the temperature control system provided, it is possible for maturation to take place at the preferred temperature of about 0° C. Cold maturation will greatly clarify the beer and, with the help of specific clarification agents added before or after maturation, render filtration of the beverage unnecessary. With respect to clarity, the beer will look like commercially available beer.

In addition, due to the vessels ability to control temperature, a wider range of beverage types can be produced, as the temperature of the contents can be set at a variety of temperatures at different times during the process, depending on what beverages are being made and at what stage the brewing process is at. Home brewers have traditionally brewed ales, as ales do not require cold fermentation temperatures and can be fermented at ambient temperatures of, for example, 20-25° C. However, not all countries have ambient temperatures of 20-25° C. all year round and temperature fluctuations still occur between day and night, so temperature control is still preferable even for ale home brewing, especially for keeping the vessel warm during cold nights during fermentation. Lager fermentations take place in the 9-14° C. range which is difficult for the home brewer to achieve without purchasing a large fridge and thermostat. With the present invention it is possible for home brewers to mimic production of famous ales such as Guinness and famous lagers such as Heineken, by fermenting at correct temperatures for the beer style or brand and also by fermenting at constant temperatures, that is, having no night and day temperature fluctuations and controlling the temperature to within +/−0.2° C. at each stage of production.

Another advantage of the present invention is that the product can be dispensed directly out of the vessel and into a glass. For this reason it is useful in a variety of situations such as in restaurants or in bars as well as at organised social events and by the home brewer who seeks easy access to a beverage delivered at a perfect temperature which can be consumed in any volume without affecting the remaining contents of the vessel.

Another advantage of the present invention is that the vessel allows for the removal of sediment from within the vessel while the contents of the vessel remain under pressure which improves both flavour and clarity of the beverage.

The present invention thus allows very fresh and high quality beverages to be produced with minimum labour (for example only 1 to 2 hours of preparation time) and very short processing times (for example, the beverage could be ready for consumption after about 4 to 9 days depending on the type of beverage being produced). The present invention would therefore be particularly suitable for home brewers and for use in bars and restaurants or any commercial outlet that wishes to sell its own high quality beer or other fermented alcoholic beverage on its premises. The size of the vessel can be adapted according to the quantities of beverage the brewer wishes to make or sell.

VARIATIONS

It will of course be realised that while the foregoing has been given by way of illustrative example of this invention, all such and other modifications and variations thereto as would be apparent to persons skilled in the art are deemed to fall within the broad scope and ambit of this invention as is hereinbefore described.

As an example, the present invention may be controlled by way of a PLC or any other control mechanism to set particular temperatures at particular times during the brewing process to minimise manual involvement. Other changes might be incorporated to make the system automated or semi-automated.

What is claimed:

1. A brewing system for brewing a fermented alcoholic beverage at home or on a small scale, said system comprising a single pressurizable vessel which in use performs at least the brewing steps of fermentation, natural carbonation, sediment removal, maturation and draw off, wherein said vessel comprises:

a sealable opening providing access to the interior of the vessel;

a temperature control system comprising (i) a heating element removably or permanently positioned outside of the vessel or a heating probe positioned inside of the vessel, (ii) a refrigeration unit removably or permanently positioned outside of the vessel or a cooling probe positioned inside of the vessel, and (iii) a temperature regulation device to selectively control the temperature of the contents of the vessel by heating and cooling as required during fermentation, natural carbonation, maturation and draw off;

a pressure regulating device coupled with the vessel and positioned outside of the vessel, the pressure regulating device configured to release excess carbon dioxide from the vessel generated during fermentation for controlling pressure build-up in the vessel and maintaining an amount of carbon dioxide in the vessel to achieve natural carbonation of the beverage;

a sediment removal means comprising a tapered profile in a lower region of the vessel where sediment is collected, and a dump valve positioned in the lower region, the dump valve being configured for separating and removing the collected sediment from the lower region of the vessel while the vessel is under pressure;

a gas inlet port positioned on an external surface of the vessel and providing fluid communication with the interior of the vessel, the gas inlet port configured for receiving a compressed gas containing carbon dioxide and introducing the compressed gas into the vessel to facilitate dispensing of the contents of the vessel, and to maintain the natural carbonation level of the beverage; and a draft dispense mechanism comprising a beer outlet line positioned in the vessel and in fluid communication with a beer outlet port on an exterior surface of the vessel, the draft dispense mechanism being removably or permanently fixed to the vessel for drawing off the contents of the vessel.

2. The brewing system as claimed in claim 1, wherein the temperature control system comprises a refrigeration unit which is removably positioned outside of the vessel on some or all of the external surfaces of the vessel when coupled with the vessel.

3. The brewing system as claimed in claim 1, wherein the vessel further comprises a dosing vessel removably connected to one of (i) the gas inlet port and (ii) the beer outlet line to add one or more clarification agents to the contents of the vessel through the gas inlet port or the beer outlet line while the vessel is under pressure and in a manner which minimizes contamination of the contents by air or undesirable micro-organisms.

4. The brewing system as claimed in claim 1, wherein the sediment removal means further comprises a sediment collection container removably located under the dump valve.

5. The brewing system as claimed in claim 1, wherein the temperature control system comprises a heating element which is permanently or removably attached to one or more external surfaces of the vessel.

6. The brewing system as claimed in claim 1, wherein the temperature control system comprises a refrigeration unit which is permanently or removably attached to one or more external surfaces of the vessel.

7. The brewing system as claimed in claim 1, wherein the at least one of a heating element or a heating probe is configured to provide sufficient heat to sanitise the vessel using hot water or steam.

* * * * *